(12) United States Patent
Sakai et al.

(10) Patent No.: US 8,100,992 B2
(45) Date of Patent: Jan. 24, 2012

(54) BIOMASS GASIFICATION APPARATUS

(75) Inventors: Masayasu Sakai, Nagasaki (JP);
Toshiyuki Takegawa, Nagasaki (JP);
Hachiro Kawashima, Isahaya (JP);
Nobuaki Murakami, Isahaya (JP)

(73) Assignee: Nagasaki Institute of Applied Science, Nagasaki (JP)

( * ) Notice: Subject to any disclaimer, the term of this patent is extended or adjusted under 35 U.S.C. 154(b) by 464 days.

(21) Appl. No.: 12/446,576

(22) PCT Filed: Oct. 22, 2007

(86) PCT No.: PCT/JP2007/070573
§ 371 (c)(1),
(2), (4) Date: Apr. 21, 2009

(87) PCT Pub. No.: WO2008/050727
PCT Pub. Date: May 2, 2008

(65) Prior Publication Data
US 2010/0299995 A1    Dec. 2, 2010

(30) Foreign Application Priority Data

Oct. 23, 2006    (JP) ................... 2006-287685

(51) Int. Cl.
*B01J 7/00* (2006.01)
(52) U.S. Cl. ........... 48/61; 48/73; 48/76; 48/75; 48/119; 48/203; 48/215; 110/205; 110/229; 110/251; 110/344; 110/347; 110/270; 110/267
(58) Field of Classification Search ............... 48/61, 73, 48/76, 75, 119, 203, 215; 110/205, 229; 110/251, 344, 347, 270, 267
See application file for complete search history.

(56) References Cited

U.S. PATENT DOCUMENTS

| | | | |
|---|---|---|---|
| 4,559,882 A | * | 12/1985 | Dobson .................. 110/254 |
| 2002/0159929 A1 | | 10/2002 | Kaneko et al. |
| 2006/0089516 A1 | * | 4/2006 | Giercke ................ 585/240 |

FOREIGN PATENT DOCUMENTS

| | | |
|---|---|---|
| JP | 2002-88379 A | 3/2002 |
| JP | 2004-51717 A | 2/2004 |
| JP | 2004-51718 A | 2/2004 |
| JP | 2005-69663 A | 3/2005 |

OTHER PUBLICATIONS

International Search Report (ISR) for PCT/JP2007/070573.
PCT/IPEA/409 in PCT/JP2007/070573.
English language translation of applicants arguments filed in submitting Article 34 Amendments in PCT/JP2007/070573.

* cited by examiner

*Primary Examiner* — Kaity V. Handal
(74) *Attorney, Agent, or Firm* — Chen Yoshimura LLP

(57) ABSTRACT

A biomass thermochemical gasification apparatus is provided that can manufacture high-quality fuel gas out of solid biomass in an industrial manner. This fuel gas can be used as fuel for a gas engine and a gas turbine for example and also can be used as synthesis gas for methanol synthesis.
A high-temperature combustion gas generation apparatus (101) for biomass operates entirely by biomass and the heat source thereof does not depend on fossil fuel. A coarsely-ground powder biomass (205) subjected to gasification and gasification agent (303) are introduced to a primary gasification reaction room (202) and generate gasification reaction by, as reaction heat, radiation heat from a wall face of the primary gasification reaction room (202) heated by combustion gas (109a) generated in the high-temperature combustion gas generation apparatus (101) and are dissolved. Consequently, the biomass (205) is converted to clean and high-quality generated gas.

11 Claims, 8 Drawing Sheets

BIOMASS GASIFICATION APPARATUS

TECHNICAL FIELD

The present invention relates to a gasification technology for converting solid biomass to convenient fuel gas. The present invention relates to a biomass gasification reaction apparatus that is practical and that generates, out of solid biomass, clean and high-quality fuel gas by a thermochemical method. This fuel gas has a high calorific value equal to that of fossil fuel, and also can be used as chemically-synthesized raw material such as methanol. The resultant generated gas can be used for fossil alternative fuel, gas engine power generation having a high power generation efficiency, and gas turbine power generation. The resultant generated gas is also used as 100%-biomass-derived methanol and synthesis gas of GTL (Gas To Liquid fuel) and is also used as 100%-biomass-derived bio diesel fuel using them.

TECHNICAL BACKGROUND

A conventional energy conversion by solid biomass has been performed mainly based on heat utilization by direct combustion. In this case, advanced energy use is difficult. In the case of power generation for example, a wood chip boiler is used to generate water vapor to generate power by a water vapor turbine. This power generation method provides a power generation efficiency of 8 to 12% in the case of an actual plant of about 1000 to 3000 kW. Such a small-scale power generation of 100 kW cannot provide an output of electric power. At present, a gasification technology has been developed to use biomass energy with high efficiency. In the case of a conventional gasification technology, a partial oxidation process has been mainly used in which biomass is half-burned in an amount equal to or lower than a theoretical amount of air or oxygen. However, this process causes a large amount of soot and tar and also causes exhaust gas used for heat generation to be mixed in the generated gas, thus failing to provide generation of high-quality gas.

In order to realize an advanced use of biomass energy, the conversion to liquid fuel is ideal from the viewpoint of the use for automobile fuel and the transportation of the fuel. In the case of a method of manufacturing liquid fuel out of biomass however, both of ethanol fuel obtained by fermentation of carbohydrate and starch as raw material and BDF (bio diesel oil fuel) obtained by the esterification of vegetable oil by an addition of methanol are manufactured meinly out of food as raw material and thus provides a low yield per area under cultivation.

A practical apparatus as an objective of the present invention that can thermochemically gasify all biomasses, such as grass plants and woody plants, to convert the biomasses to chemically-synthesized raw material has been not yet developed.

In recent years, a floating external heat-type gasification method has been developed to obtain, out of biomass, clean fuel gas of a high calorie adapted to a power generation gas engine. The details of this method are disclosed in the following Patent Document 1, Patent Document 2, and Patent Document 3. Patent Document 1 discloses a biomass gasification apparatus in which a biomass burning space is separated from a biomass gasification space. This apparatus uses a high temperature complete combustion gas obtained from the biomass burning space to heat the biomass gasification space and also supplies the high temperature complete combustion gas to the gasification space through a plurality of through holes. By this apparatus, the heat generation reaction in the burning space and the endothermic reaction in the gasification space are separately controlled so as to gasify the biomass easily, thus providing high-quality fuel gas which has been impossible in the conventional technology. In the case of this apparatus however, uniformizing the generated gas from biomasses is realized by introducing the high-temperature combustion gas to the gasification space via the through holes. Due to this, disadvantages have been caused in that the generated gas is mixed with a large amount of carbon dioxide gas and nitrogen included in the high temperature complete combustion gas to cause a deteriorated quality of generated gas, generated gas and biomass as raw material of generated gas are dissipated, the distribution of gasification agent is uneven, and many fine pores must be processed for example.

Patent Document 2 and Patent Document 3 disclose a technology to supply water vapor to the gasification space. Although the above disadvantages are solved by the addition of water vapor, some technical problems including the following points that should be solved or improved remain unsolved.

The first disadvantage is that biomass as gasification raw material must be fine powders of about 3 mm or less and thus a high grinding power is required and coarse powders of 10 to 20 mm cause a trouble.

The second disadvantage is that the gasification agent supplied to the gasification space (e.g., water vapor) intrudes into a biomass supply hopper to cause dew condensation or to cause the biomass fine powders to contain a large amount of water. This consequently makes it difficult to smoothly supply the biomass fine powders to the gasification space, thus remarkably deteriorating the gasification efficiency in the gasification reaction room.

The third disadvantage is that a ratio of hydrogen in the composition of the resultant fuel gas is low and thus the resultant fuel gas is still insufficient as synthesis gas for synthesizing methanol or GTL for example.

Patent Document 1: Japanese Patent Publication No. 2002-88379 A
Patent Document 2: Japanese Patent Publication No. 2004-51717 A
Patent Document 3: Japanese Patent Publication No. 2004-51718 A

DISCLOSURE OF THE INVENTION

Problem to be Solved by the Invention

In view of the disadvantages as described above, it is an objective of the present invention to provide the gasification of biomass for generating high-quality fuel gas that includes a very small amount of soot and tar, that is clean, that has a high calorific value, and that has a superior theoretical adiabatic combustion temperature. It is another objective of the present invention to provide a biomass gasification apparatus that is a small plant but that is superior to large biomass chip power generation using a steam turbine, that is highly-efficient and that is suitable for the local-production-for-local-consumption-type one or the small-scale-distributed-type one, and that allows the resultant generated gas (i.e., fuel gas) to be directly used in a gas engine and a gas turbine. It is still another objective of the present invention to allow the resultant generated gas to contain hydrogen and carbon monoxide as main components and to provide the resultant generated gas with a quality by which the gas also can be used as synthesis gas of chemically-synthesized raw material such as methanol and GTL for example.

An improved use of the energy of the biomass as described above has a high potential in the scale. Thus, such a use may satisfy the strong needs from the age for a substitute technology that can get out of the current energy supply situation in Japan that exclusively depends on fossil fuel.

Means for Solving Problem

A biomass gasification apparatus of the present invention comprising, a high-temperature combustion gas generation apparatus for combusting a biomass to generate combustion gas, a biomass supply hopper, and a gasification reaction apparatus. The gasification reaction apparatus includes therein a primary gasification reaction room connected to a secondary gasification reaction pipe and to a gasification agent supply line and the primary gasification reaction room is connected to the biomass supply hopper via a biomass supply line, and
the high-temperature combustion gas generation apparatus is connected to the gasification reaction apparatus via a combustion gas supply line.

The above configuration has enabled all heat sources required for the biomass gasification to be obtained by biomass combustion gas and also has enabled high-quality fuel gas (hereinafter also may be referred to as generated gas) to be obtained. For example, a low-quality biomass having low shape formability can be combusted and the generated combustion gas can be used as a heat source to gasify the biomass, thereby providing high-quality generated gas.

The heat source required for biomass gasification is obtained by causing a low-cost biomass to be combusted in the high-temperature combustion gas generation apparatus to obtain combustion gas equal to or higher than 800 degrees C. and preferably equal to or higher than 1000 degrees C. The resultant combustion gas as a heat source is supplied via the combustion gas supply line to the primary gasification reaction room.

The biomass as raw material for the generated gas causes a gasification reaction with the gasification agent such as water vapor supplied from the gasification agent supply line by, as reaction heat, radiation heat from a wall face of the primary gasification reaction room. During this reaction, the primary gasification reaction room does not require an input of pure oxygen requiring an oxygen apparatus and also limits air introduction to zero or a small amount. Thus, the primary gasification reaction room includes only a small amount of a nitrogen component. Therefore, high-quality generated gas having a high calorific value and a high theoretical combustion temperature and including a very small amount of soot and tar can be obtained.

Since the primary gasification reaction room is linked to the secondary gasification reaction pipe, tar and soot can be dissolved in a substantially-complete manner and clean generated gas can be obtained that can be used as gas engine fuel having a standard structure for a long period.

A biomass for combustion or fuel gasification is preferably broken to small pieces of a few mm to a few hundred mm and more preferably of substantially 2 cm or less (hereinafter may be referred to as "chip-like biomass", "biomass chip", or "coarsely-ground powder biomass").

The biomass gasification apparatus of the present invention is preferably structured, in order to allow the high-temperature combustion gas generation apparatus to obtain combustion gas equal to or higher than 800 degrees C., so that a downward flow-type vertical combustion furnace having a fixed floor is basically used, a lower part of the vertical combustion furnace has a fire grate, primary air is supplied from an upper part of the fire grate through injection holes at one or more positions to subsequently supply secondary air through a discharge orifice from an interior of the metal fire grate having a function to cool the fire grate to supply tertiary air required for complete combustion from a lower part of the fire grate and, suction by a chimney pipe or an induced draft fan is performed at an outlet of the high-temperature combustion gas generation apparatus.

According to the above mentioned configuration, in order to generate combustion gas of at least 800 degrees C. or more and preferably 1000 degrees C. or more at the outlet of the high-temperature combustion gas generation apparatus in a clean manner and without causing an unburned combustion component, the combustion furnace is the vertical fixed floor-type one in which the lower part has the fire grate and the primary air is supplied as a downward flow from the upper part of the fire grate. Next, the secondary air is discharged from the interior of the fire grate made of metal through a plurality of discharge orifices to maintain the combustion and to control the combustion rate. Then, the tertiary air is supplied to a combustion gas discharge section at the lower part of the fire grate to achieve clean complete combustion and the temperature control of the discharged high temperature gas. The combustion gas is sucked by the chimney pipe or the induced draft fan at the outlet section to maintain the downward flow.

By the combustion method as described above, the layered structure of chip-like biomasses supplied from the upper part of the furnace has the highest combustion temperature in the vicinity of the fire grate and the combustion gas is completely combusted by the tertiary air under the fire grate. In this combustion method, the fire grate section has a temperature reaching 1300 degrees C. or more. Thus, the metal fire grate must be cooled by the secondary air. At the outlet section under the fire grate, complete combustion at high temperature is achieved by the tertiary air to completely combust an unburned combustion component so that any unburned hydrocarbon, soot and CO do not remain. Thus, clean combustion gas free from dioxin can be obtained. The completely-combusted gas by the addition of the tertiary air is supplied to the gasification reaction apparatus while having high temperature exceeding 800 degrees C. to 1000 degrees C.

The high-temperature combustion gas generation apparatus can control a biomass fuel combustion rate depending on the supply amount of the primary air and the secondary air per hour and can use the tertiary air to achieve a complete combustion of unburned gas and to control high-temperature combustion gas discharge temperature. By this configuration, the gasification reaction apparatus can provide a reaction environment suitable for the biomass and an application of the generated gas.

In the biomass gasification apparatus of the present invention, the primary air, the secondary air, and the tertiary air supplied to the high-temperature combustion gas generation apparatus are preferably preheated in order to simplify the control of the combustion rate depending on a difference in a biomass quality, particularly contained water and a discharge temperature of the high-temperature combustion gas. By preheating air, the combustion efficiency of a biomass chip containing a large amount of water can be improved and the combustion gas supplied to the gasification reaction apparatus can be prevented from having a decreased temperature. The preheating is generally performed at 150 to 450 degrees C.

In the biomass gasification apparatus of the present invention, the biomass supply hopper may include a coarse powder-accompanying gas supply line. The supply of the biomass raw material is performed so that the biomass raw material is accompanied by the coarse powder-accompanying gas selected from nitrogen gas, carbon dioxide, air, or the mixture thereof in an amount having a weight ratio to the biomass of 2 to 15% in the case of carbon dioxide, a weight ratio to the biomass of 2 to 10% in the case of nitrogen, and a weight ratio to the biomass of 2 to 5% in the case of air. This consequently can prevent the water vapor supplied to the primary gasification reaction room from intruding the biomass supply hopper, thus preventing the humidification of the biomass in the biomass supply hopper.

The coarse powder-accompanying gas may be selected depending on a usage of the generated gas. For example, carbon dioxide is advantageously used when the generated gas is used for methanol synthesis. An appropriate amount of nitrogen mixed in the accompanying gas has an effect of reducing water vapor. When considering the calorific value required to heat water enthalpy to an overheat water vapor enthalpy of a reaction temperature, nitrogen gas is preferably used for a gas engine fuel application where higher calorific value is prioritized. In this case, another option is air for reasons of the availability of nitrogen gas and cost.

In the biomass gasification apparatus of the present invention, a lower part of the primary gasification reaction room may have a ceramic porous plate or a punching-type porous plate, the biomass raw material may be supplied from an upper part of the primary gasification reaction room and, gasification agent may be supplied from a lower part of the porous plate in an upward flow.

According to the above configuration, the coarsely-ground powder biomass having a size of substantially 2 cm or less is supplied from the biomass supply hopper to the primary gasification reaction room. The gasification agent is supplied in an upward flow from the gasification agent supply line linked to the lower part of the primary gasification reaction room. The lower part of the primary gas reaction room has a ceramic porous plate or a punching-type porous plate to capture the remaining biomasses not gasified in the primary gasification reaction room on the porous plate. Most of the coarsely-ground powder biomass reacts with the gasification agent while floating and is gasified instantly. However, the remaining biomass captured on the porous plate is gasified for a long time. It is confirmed that the composition of the generated gas is not influenced by the particle size or the diameter of the coarse powder biomass and has high hydrogen concentration. Since the biomass is not required to be ground to fine powders, the cost for the power for grinding is also reduced.

The gasification agent may be water vapor, carbon dioxide, or the mixture thereof. Depending on the biomass quality, a required amount of the gasification agent is different.

In the case of a general woody biomass, when assuming that the brief molecular formula is $C_{1.3}H_2O_{0.9}$ (molecular weight), in the case of water vapor, the minimum required amount is $0.4H_2O$ and $3H_2O$ is preferred for an actual operation. However, an excessive amount of water vapor deteriorates the heat efficiency. Thus, in the configuration of the present invention, water vapor is supplied in a weight ratio of 2 or more in principle. The water vapor gasification agent may be supplied to the dry biomass in a weight ratio to the biomass of 0.6 or more and preferably 2 or more.

In the biomass gasification apparatus of the present invention, an outer space of the primary gasification reaction room and an outer space of the secondary gasification reaction pipe may have therebetween a heat-resistant partition wall that allows ventilation of the high temperature combustion gas and that can block heat radiation between the primary gasification reaction room and the secondary gasification reaction pipe and, the combustion gas may be firstly introduced to an outer periphery of the primary gasification reaction room to heat the primary gasification reaction room and may be then introduced to an outer periphery of the secondary gasification reaction pipe to heat the secondary gasification reaction pipe. According to the above configuration, the combustion gas introduced from the high temperature hot gas generation apparatus can be supplied in a prioritized manner to the primary gasification reaction room requiring higher temperature.

In the biomass gasification apparatus of the present invention, a body of the primary gasification reaction room is made of ceramic material such as aluminum titanate or is coated with the same metal material or is made of high-temperature resistant material such as high-chrome or high-nickel alloy. This can consequently improve the range within which the primary gasification reaction room can operate.

A certain type of aluminum titanate has higher heat resistance than that of cordierite, has higher resistance to thermal shock than that of silicon carbide, and can realize heat resistance and thermal shock resistance at a practical level. Thus, this type of aluminum titanate can be used as material of the primary gasification reaction room instead of metal. The use of the above configuration can allow, depending on an application of the generated gas (e.g., a case where the reaction temperature is desired to be increased to increase the amount of generated hydrogen), the primary gasification reaction temperature to be more freely selected without being limited by the limit of the heat-resistant temperature of the metal and a margin also can be provided to a variation in the operational temperature.

In the biomass gasification apparatus of the present invention, a wall area of the primary gasification reaction room to a supply of dry biomass raw material of 1 kg/h is at least 0.008 $m^2$ or more when a wall temperature is 800 degrees C. and is at least 0.004 $m^2$ or more when the wall temperature is 1000 degrees C.

The reaction endotherm amount when water vapor is introduced with a molar ratio of 3 to the biomass can be represented by the following formula.

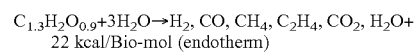
$$C_{1.3}H_2O_{0.9}+3H_2O \rightarrow H_2, CO, CH_4, C_2H_4, CO_2, H_2O+ 22 \text{ kcal/Bio-mol (endotherm)}$$

Specifically, reaction heat of about 700 kcal/1 kg-Bio to dry biomass of 1 kg must be given. When assuming that the heat radiation from the reaction room wall is 900 degrees C., the biomass gasification of 1 kg/h is established by providing the area of the reaction room wall of 0.008 $m^2$ or more and preferably 0.01 $m^2$ or more. When an objective is to obtain synthesis gas as chemically-synthesized raw material, higher gasification reaction room temperature is advantageous. In this case, when the reaction room wall temperature is 1100 degrees C., the reaction room wall area to the biomass of 1 kg/h may be substantially 0.004 $m^2$ or more and preferably 0.005 $m^2$ or more.

In the biomass gasification apparatus of the present invention, the biomass gasification apparatus may have a control function to control, depending on the contained water of the biomass, an amount of the biomass supply from the biomass hopper to provide an appropriate generated gas quality.

In the above configuration, when water contained in the biomass supplied to the primary gasification reaction room is 20 weight % for example, the amount of the biomass is reduced by 20% and supplied when compared with a case where the dry biomass is supplied. In order to be able to adjust the supply amount of the biomass, the transfer amount of the screw feeder of the biomass supply line may be adjustable by the rotation number of the screw and the transfer amount may be adjusted depending on the biomass water input data during the operation.

The gas composition of the generated gas such as $H_2$, CO, or $CH_4$ is preferably controlled depending on an application of the generated gas by the temperature of the primary gas reaction room, a weight ratio of the biomass raw material to the water vapor of the gasification agent, the supply amount of the biomass raw material, the rate of the contained water in the biomass raw material, and the grinding degree of the biomass raw material.

The biomass gasification reaction apparatus of the present invention is a technology for generating fuel gas from a biomass that can achieve high temperature combustion equal to that by fossil fuel. The biomass gasification reaction apparatus of the present invention also can be used for synthesis gas that also may be chemically-synthesized raw material. When the resultant gas is used as synthesis gas, the composition ratio between hydrogen ($H_2$) and carbon monoxide (CO) in the gas composition is important. In the case of methanol synthesis for example, $H_2$ and CO are desirably contained in the gas composition with a high ratio and $H_2$/CO molar ratio≈2 is desired.

In order to obtain $H_2$ and CO having an appropriate ratio, an operation as shown below can be performed to obtain target synthesis gas.

(1) When the $H_2$ Composition is Desired to be Increased

The particle diameter of the biomass supplied to the primary gasification reaction room is reduced. The temperature of the gasification reaction room is increased. The amount of the gasification agent is increased. The amount of the biomass supplied to the primary gas gasification reaction room is reduced. The amount of the coarse powder raw material of 10 to 20 mm is increased and the gasification reaction on the porous plate is increased.

(2) When the CO Composition is Desired to be Increased

The amount of the biomass supplied to the primary gasification reaction room is increased to reduce the time during which the biomass remains in the gasification reaction room. The diameter of the biomass particles is enlarged. The temperature of the primary gasification reaction room is reduced (but the temperature must be 800 degrees C. or more).

For a gas engine, a large amount of $CH_4$ may be included. When methanol synthesis is performed, it is important that $H_2$ and CO are contained in a large amount and the balance of $H_2$/CO is maintained.

The combustion gas used for the heating in the gasification reaction apparatus is preferably discharged, after the use, to an outside of the gasification reaction apparatus and can be collected in a heat recollector by a waste heat boiler to generate overheat water vapor that is used as the gasification agent.

When overheat water vapor is used as the gasification agent, overheat water vapor is made out of water by the heat recollector from the exhaust gas. Thus, the heat loss can be significantly reduced.

As described above, the mixed gas of carbon dioxide and water vapor also may be used as the gasification agent instead of water vapor.

By the above configuration, when the generated gas is used for methanol synthesis, carbon dioxide is bound to hydrogen to generate methanol.

Thus, when hydrogen for raw material gas for synthesis can be supplied by a means other than the apparatus according to the present invention, the amount of methanol synthesis can be increased economically.

Effect of the Invention

According to the present invention, the heat source required to heat the primary gasification reaction room can be obtained as the combustion gas of a biomass by the high-temperature combustion gas generation apparatus. In particular, by the high-temperature combustion gas generation apparatus structured to have a three-stage air supply by a downward flow, clean combustion gas having higher temperature can be obtained.

Furthermore, the biomass supply hopper including the coarse powder-accompanying gas supply line can prevent the dew condensation in the biomass supply hopper or water absorption by the biomass in the biomass supply hopper, thus improving the gasification performance efficiency.

Furthermore, the porous plate provided in the primary gasification reaction room not only can realize the gasification processing of coarse biomass having a large particle size but also can prevent the deterioration of the quality of the generated gas.

By the biomass gasification apparatus of the present invention, clean and high-quality fuel gas can be obtained. This fuel gas has combustion temperature equal to that of fossil fuel. Thus, this fuel gas can be used for gas engine power generation and gas turbine power generation having high power generation efficiency.

Furthermore, the composition of the fuel gas includes $H_2$ and CO as main components. Thus, the fuel gas also can be used as synthesis gas for chemically-synthesized raw material and can be used as raw material gas for the manufacture of liquid fuel such as methanol and GTL.

DESCRIPTION OF THE REFERENCE NUMERALS

Figure 1:
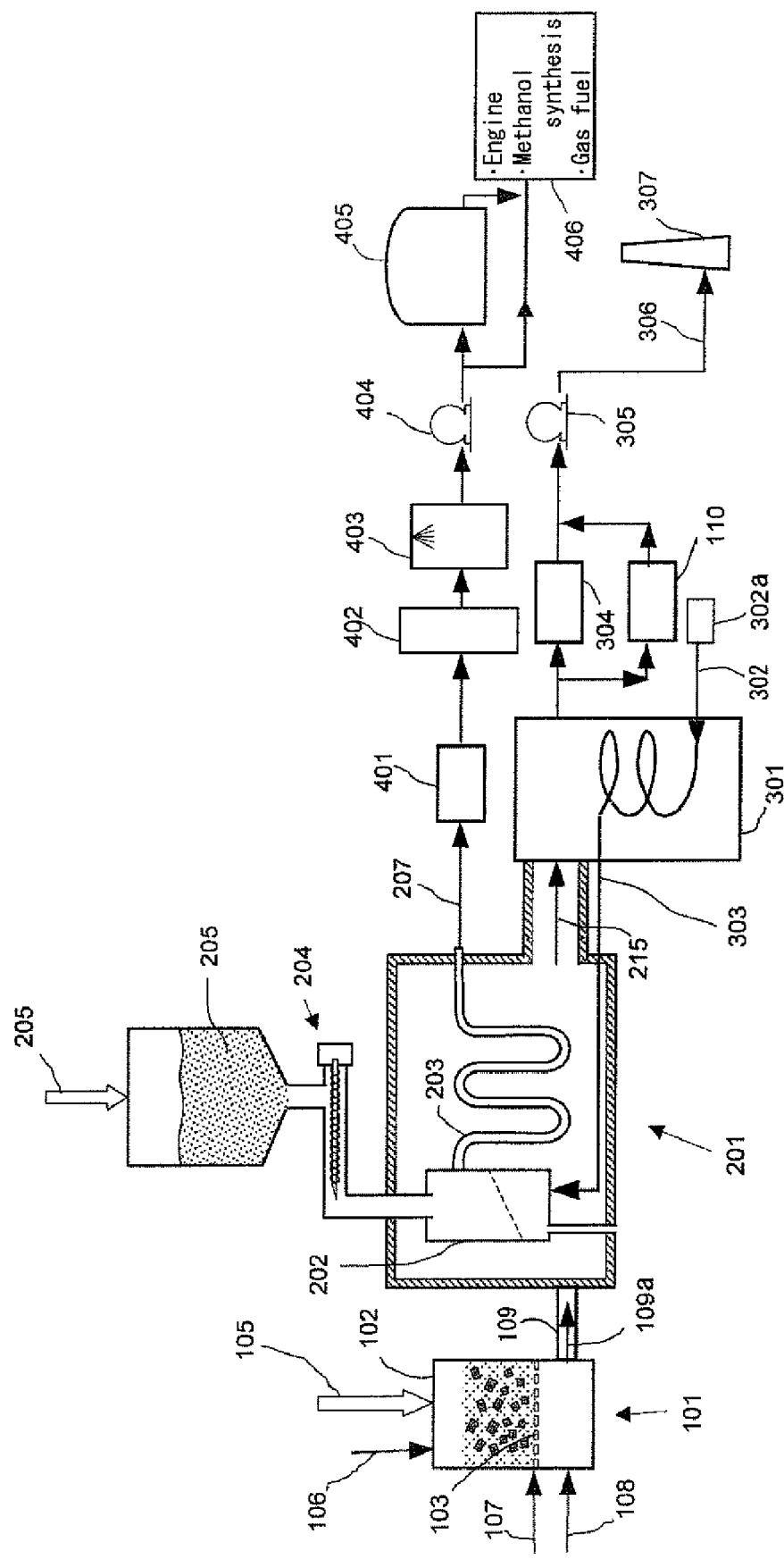
FIG. 1 shows a schematic view illustrating the entire configuration of a biomass gas thermochemical gasification apparatus according to the first embodiment of the present invention.

101 High-temperature combustion gas generation apparatus
102 Combustion furnace
103 Fire grate
104 Secondary air discharge orifice
105 Biomass chip
106 Primary air
107 Secondary air
108 Tertiary air
109 Combustion gas supply line
109a Combustion gas
110 Air preheater
111 Furnace bottom combustion room
112 ash heap
113 Air
201 Gasification reaction apparatus
202 Primary gasification reaction room
203 Secondary gasification reaction pipe
204 Biomass supply line
205 Coarsely-ground powder biomass
206 Coarse powder-accompanying gas supply line
206a Coarse powder-accompanying gas
207 Generated gas and fuel gas
208 Biomass supply hopper
209 Reaction furnace high-temperature room
210 Porous plate
211 Heat insulation material
212 Heat-resistant partition wall
213 Gasification agent
214 Ash outlet
215 Exhaust gas
301 Waste heat boiler
302 Gasification agent supply line
303 Gasification agent (overheat water vapor)
304 Heat use user
305 Induced draft fan
306 Exhaust gas
307 Chimney pipe
308 Gasification agent substitute gas (carbon dioxide)
401 Heat exchanger
402 Cyclone
403 Scrubber
404 Forced draft fan
405 Fuel gas tank
406 Application

THE BEST MODE FOR CARRYING OUT THE CLAIMED INVENTION

First Embodiment

FIG. 1 illustrates one embodiment of a biomass gasification apparatus of the present invention.

In a high-temperature combustion gas generation apparatus 101, biomass is combusted to generate clean combustion gas 109a (shown by the arrow) having high temperature exceeding 900 degrees C. The combustion gas 109a is sent from a combustion gas supply line 109 to a gasification reaction apparatus 201 to heat a primary gasification reaction room 202 provided in the gasification reaction apparatus 201 and a secondary gasification reaction pipe 203 connected to the primary gasification reaction room 202 from the outer wall face. Thereafter, the combustion gas 109a is exhausted as exhaust gas 215 from the gasification reaction apparatus 201.

The exhaust gas 215 causes overheat water vapor 303 to be generated in a waste heat boiler 301. The overheat water vapor 303 is supplied from a gasification agent supply line 302 to a bottom section of the primary gasification reaction room 202. A biomass 205 is dropped and supplied to the primary gasification reaction room 202 from a biomass supply line 204 connected to the upper part. The biomass supply line 204 transports a coarsely-ground powder biomass 205 supplied from a biomass supply hopper 208 by a screw feeder. In the primary gasification reaction room 202, the coarsely-ground powder biomass 205 and overheat water vapor as gasification agent absorb the radiation heat from the wall of the primary gasification reaction room 202 as chemical reaction heat to gasify the coarsely-ground powder biomass 205 by a water vapor reforming reaction. This gasification reaction does not use a catalyst.

The gas generated in the primary gasification reaction room 202 further promotes the gasification reaction of tar and soot. Thus, this gas is sent to the secondary gasification reaction pipe 203 and is finally sent as fuel gas 207 having a composition of target components (shown by the arrow) to a fuel gas tank 405. In a course through which the generated gas (fuel gas) 207 is sent to the fuel gas tank 405, a heat exchanger 401 for collecting waste heat, a cyclone 402 for removing ash and soot, a water spray/scrubber 403 for removing remaining water vapor, and a forced draft fan 404 for sending the generated gas 207 to the fuel gas tank 405 are provided.

The generated gas 207 stored in the fuel gas tank 405 and the generated gas 207 directly sent from the forced draft fan 404 are used as an application 406 that is high-quality fuel gas such as engine power generation gas, turbine power generation gas, petroleum substitute fuel gas, and chemically-synthesized raw material synthesis gas. On the other hand, the exhaust gas 215 of the high-temperature combustion gas 109 used for the gasification reaction in the gasification reaction furnace is used for the generation of the overheat water vapor in the waste heat boiler 301 and is subsequently further used for a thermal use 304 when there is a thermal demand. Thereafter, the exhaust gas 215 is discharged by an induced draft fan 305 through the chimney pipe 307 to atmosphere.

Figure 2:
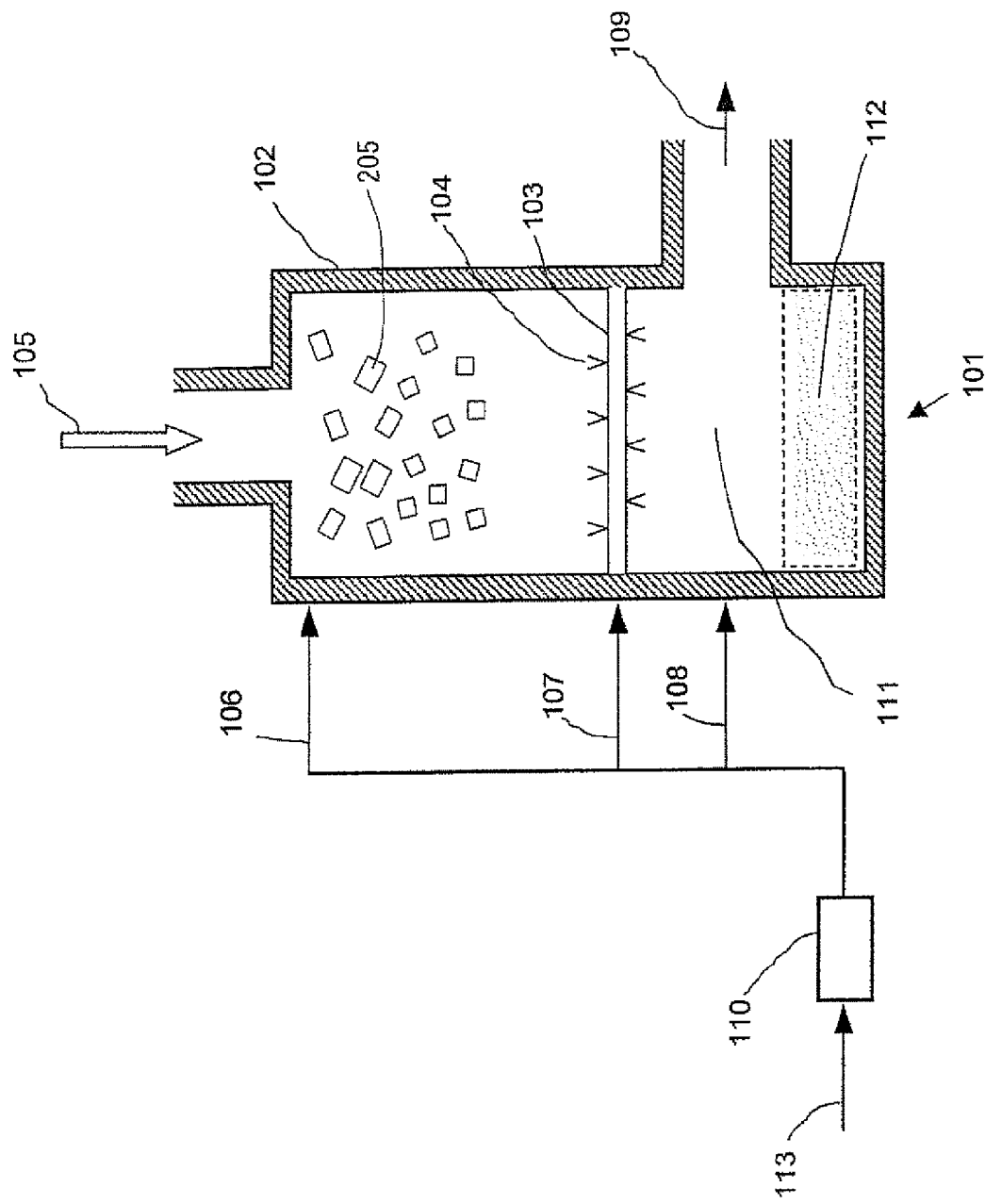
FIG. 2 shows a schematic view illustrating a high-temperature hot gas generation apparatus according to the first embodiment.

FIG. 2 shows an expanded cross-sectional view illustrating the high-temperature combustion gas generation apparatus 101 shown in FIG. 1 of the present invention. The combustion furnace 102 is structured to have a shaft furnace-type fixed floor and the lower part of the combustion furnace has a fire grate 103. The biomass 205 used as a fuel is obtained by forming biomass chips 105 to have an appropriate shape of about 10 cm and is dropped from the top of the combustion furnace 102 into the high-temperature combustion gas generation apparatus 101.

As combustion air, primary air 106 from the upper part, secondary air 107 from the neighborhood of the fire grate 103, and tertiary air 108 from the lower part of the fire grate 103 are supplied. The air or combustion gas in the combustion furnace 102 is caused to flow in the lower direction because the discharged combustion gas 109 is induced by the induced draft fan 305 (see FIG. 1) at the downstream part to a chimney pipe. By this formation, the temperature in the combustion furnace reaches the highest combustion temperature in the vicinity of the upper part of the fire grate 103. The combustion gas including some combustible gas is completely combusted by the tertiary air 108 in a furnace bottom combustion room 111 under the fire grate in a clean manner.

The cleanliness levels of the gas quality of the generated combustion gas 109a are shown in the following example.
Oxygen ($O_2$) 4.2%
Carbon dioxide ($CO_2$) 14.6%
Hydrogen chloride (HCl) 430 ppm
Hydrogen sulfide ($H_2S$) 120 ppm
hydrocarbon ($C_mH_n$) 0%
Carbon monoxide (CO) 0%
Dioxin Equal to or lower than detection limit
Combustion temperature 1220 degrees C.

A further characteristic in this embodiment is that an air preheater 110 that can heat the primary air 106, the secondary air 107, and the tertiary air 108 to 450 degrees C. at the maximum is provided and thus even the biomass chips 105 containing 60% of water can be easily combusted. Another further characteristic in this embodiment is that the combustion temperature in the fire grate 103 is high temperature exceeding 1300 degrees C. and thus a structure for resisting such high temperature is provided so that the interior of the metal structure of the fire grate 103 is cooled by a part or the entirety of the secondary air 107 and then the secondary air 107 is discharged as a combustion air through many secondary air discharge orifices 104.

Figure 3:
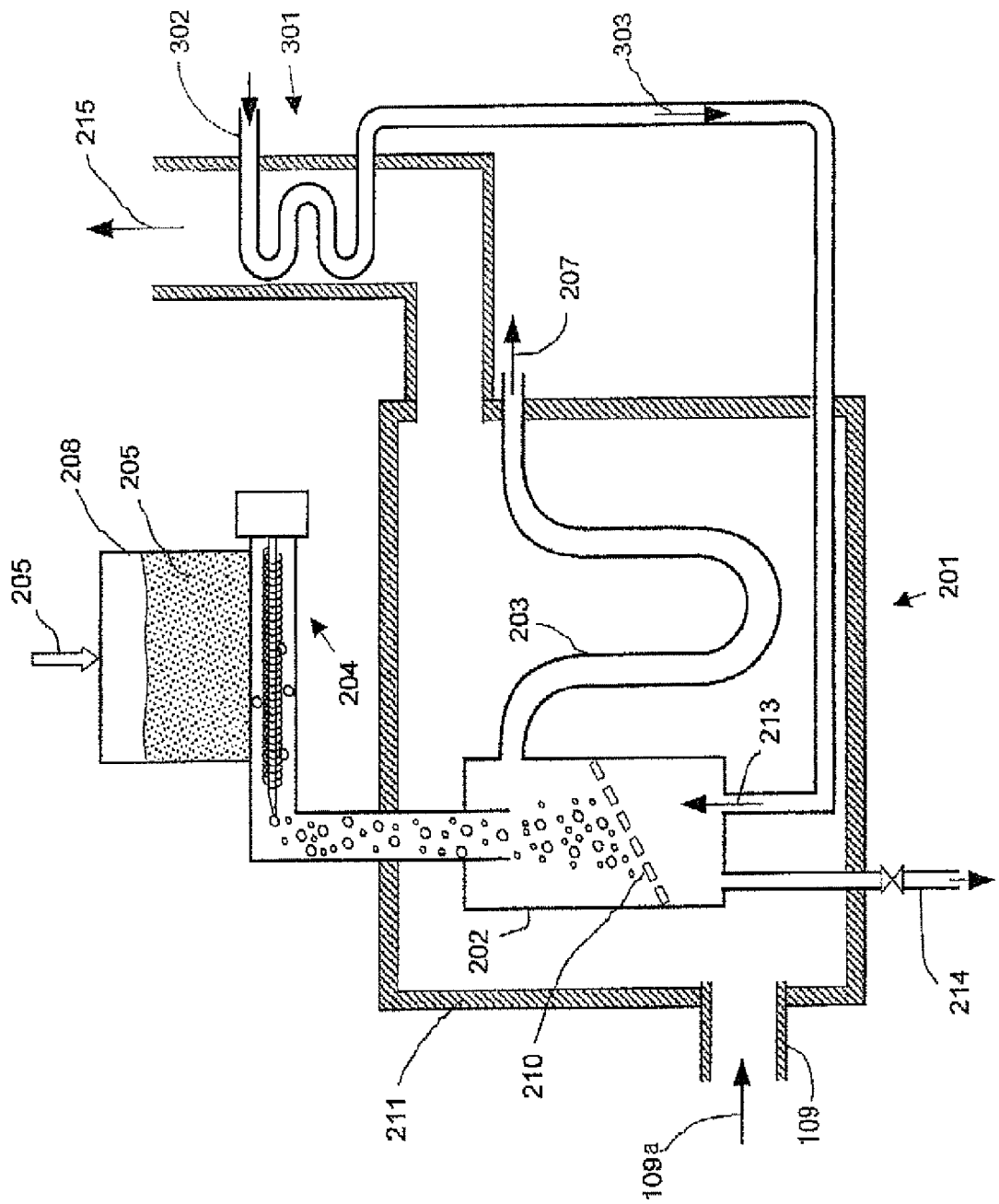
FIG. 3 shows a schematic view illustrating a biomass gasification reaction apparatus according to the first embodiment.

FIG. 3 illustrates one embodiment of the gasification reaction apparatus 201 of the present invention. The inner face of the outer wall of the gasification reaction apparatus 201 is covered by heat insulation material 211. The gasification reaction apparatus 201 includes therein the primary gasification reaction room 202 and the secondary gasification reaction pipe 203 connected to the primary gasification reaction room 202. The upper part of the primary gasification reaction room 202 is linked to the biomass supply line 204. The biomass 205 is supplied from a biomass supply hopper 208 and is transported by the biomass supply line 204. Then, the biomass 205 is dropped and supplied from the upper part of the primary gasification reaction room 202.

Overheated water vapor 303 (shown by the arrow) obtained by waste heat boiler 301 is supplied as biomass gasification agent 213 from gasification agent supply line 302 to the bottom of the primary gasification reaction room 202.

The combustion gas 109a is introduced from the combustion gas supply line 109 to the interior of the gasification reaction apparatus 201 to heat the primary gasification reaction room 202 and the secondary gasification reaction pipe 203.

In the primary gasification reaction room 202, chemical reaction between the biomass chips 205 and the gasification agent 213 is caused by the radiation heat from the wall of the reaction room, thereby generating the generated gas 207 such as $H_2$, CO, $CH_4$, $C_2H_4$, and $CO_2$.

At a position in a range from the lower part to the middle of the interior of the primary gasification reaction room 202, a punching porous plate 210 is provided that is made by a ceramic porous plate or a copper plate for example. The coarsely-ground powder biomass 205 of substantially 3 mm or more remains on the porous plate 210 and is gasified. The generated gas gasified in the primary gasification reaction room 202 may include some soot and tar. Thus, the generated gas is sent to the secondary gasification reaction pipe 203 and the remaining soot and tar are redissolved and gasified by the gasification agent to obtain clean generated gas that is used as the fuel gas 207.

Figure 4:
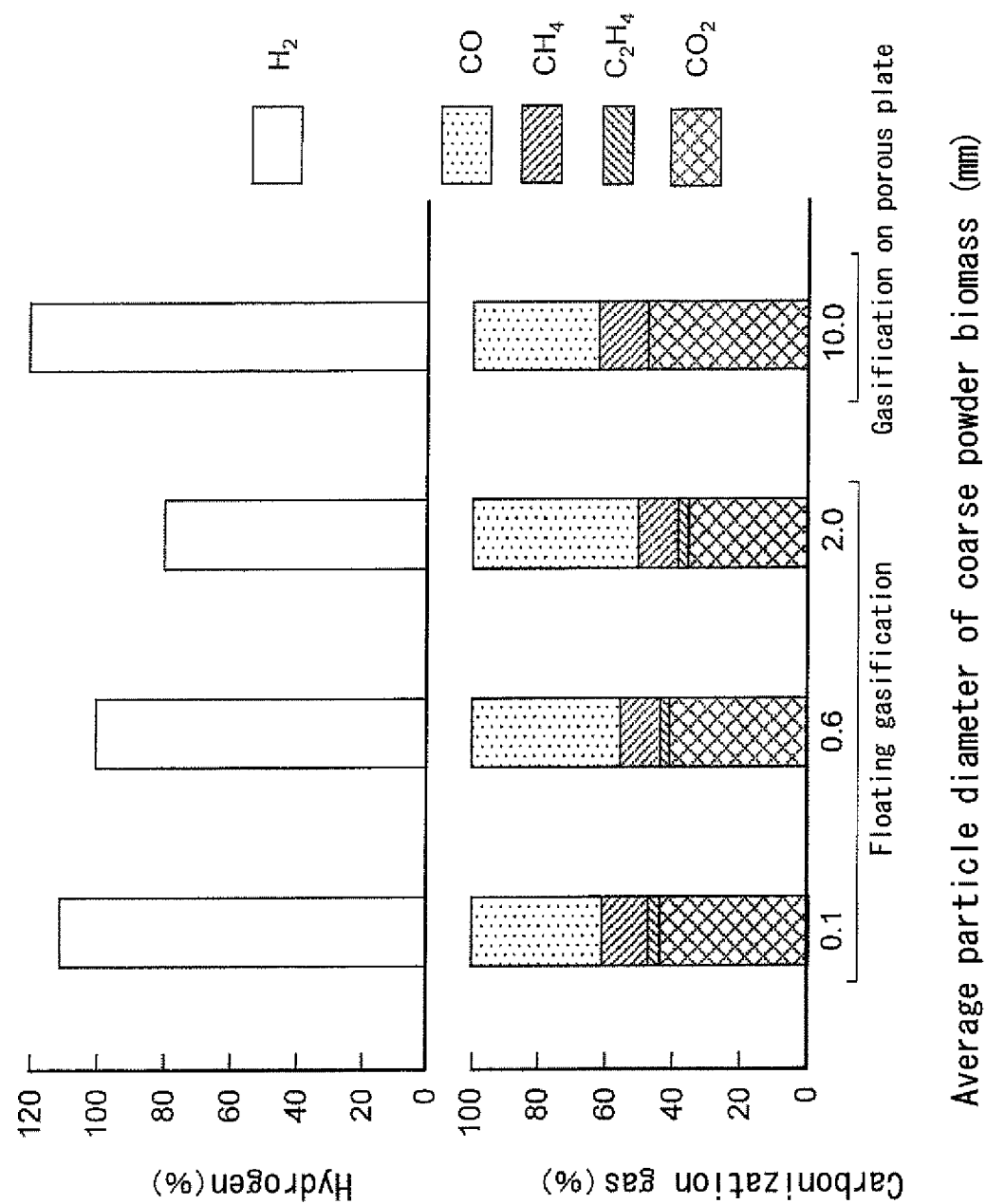
FIG. 4 illustrates an example of a relative ratio of the generated gas composition at gasification reaction temperature of 900 degrees C. according to the first embodiment.

FIG. 4 illustrates a comparison of the composition between the generated gas by the floating gasification of the microparticle biomass and the generated gas by the gasification of the coarse powder biomass on the porous plate 210 in an embodiment of the present invention. The graph shown at the lower side assumes that the generated gas has a 100% carbonization gas composition. Since ethylene $C_2H_4$ means two carbon atomic molecules, the composition % was doubled to assume the total carbon gas as 100%.

The graph shown at the upper side illustrates a percentage of the generated hydrogen $H_2$ to the carbonization gas 100%. Any of the results were obtained by the primary gasification reaction room at 900 degrees C.

The amount of hydrogen $H_2$ is caused not only by the hydrogen in the biomass (e.g., $C_{1.3}H_2O_{0.9}$) but also by the reaction between the hydrocarbon gas of the biomass gasified component and the water vapor. For example, this can be represented by $C_2H_4+4H_2O \rightarrow 2CO_2+6H_2$.

Thus, it can be assumed that the gasification reaction is promoted as the hydrogen amount in the upper graph increases.

As can be seen from FIG. 4, in the gasification reaction in which biomass particles of 0.1 mm, 0.6 mm, and 2.0 mm float in the gasification agent, the biomass of smaller particles can be gasified more easily while the biomass of larger particles is suppressed from the promotion of the gasification reaction. However, as can be seen from FIG. 4, even the coarse powder biomass having a size of 10 mm can be subjected to the gasification reaction equal to or higher than the floating gasification by causing the biomass to remain on the porous plate to gasify the biomass. In this case however, the biomass remaining on the porous plate requires a few minutes of gasification reaction time while microparticles require the floating gasification reaction of substantially 1 second or less.

Second Embodiment

Figure 5:
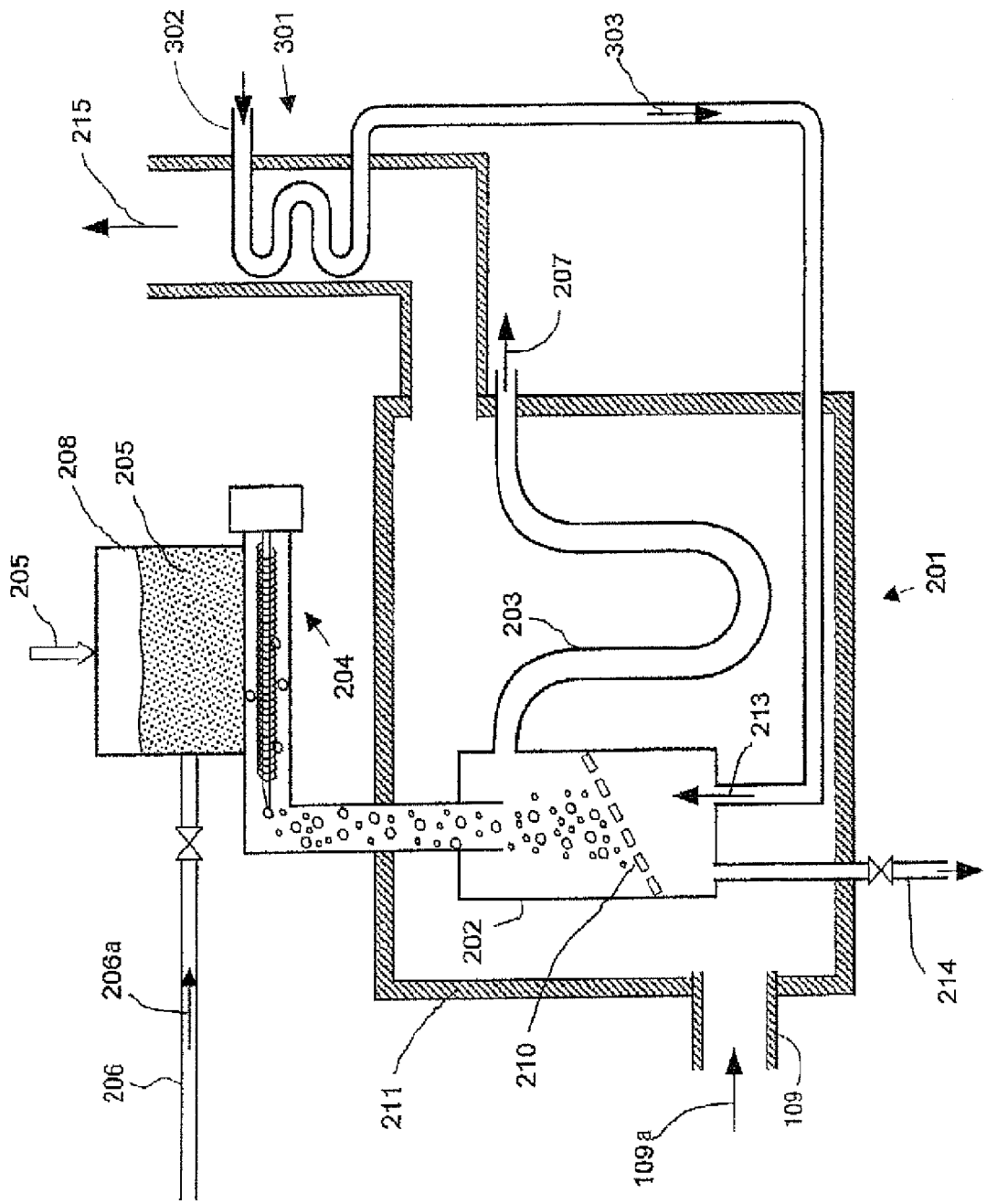
FIG. 5 shows a schematic view illustrating a biomass gasification reaction apparatus according to the second embodiment including the supply of coarse powders-accompanying gas to the hopper of the gasification reaction apparatus.

FIG. 5 shows a schematic view illustrating the gasification reaction apparatus 201 according to the second embodiment of the present invention in which the biomass supply hopper 208 has a coarse powder-accompanying gas supply line 206.

In this embodiment, $N_2$, $CO_2$, air, or the mixture thereof as coarse powder-accompanying gas 206a is sent from the coarse powder-accompanying gas supply line 206 into the biomass supply hopper 208 for temporarily storing the coarsely-ground powder biomass chips 205. Most part of the coarse powder-accompanying gas and the biomass chip 205 are dropped and supplied to the primary gasification reaction room 202 via the biomass supply line 204.

When this coarse powder-accompanying gas 206a is not supplied, a part of the water vapor introduced in a great amount to the primary gasification reaction room 202 via the biomass supply line 204 flows into the biomass supply hopper 208. This causes, according to an experiment, the dew condensation of the coarsely-ground powder biomass 205 stored in the biomass supply hopper 208 and still having a low temperature and thus a large amount of water is absorbed by the coarsely-ground powder biomass 205. Specifically, a case for example was found in which 15% of water absorbed in the coarsely-ground powder biomass increased to 60% of water within a long time.

The water contained in the coarsely-ground powder biomass evaporates in the primary gasification reaction apparatus 202 and is heated to high temperature. This causes a significant heat loss including the evaporative latent heat and thus causes deteriorated gasification efficiency. The gasification efficiency of the gasification reaction apparatus largely depends on the water contained in the coarsely-ground powder biomass. For example, the gasification efficiency of the gasification reaction apparatus shows a tendency as shown in the following Table 1 when compared with a case of biomass gasification at 100 kg/h.

TABLE 1

Example of deterioration of biomass gasification processing capability

| Contained water | Processing capability |
| --- | --- |
| Dried and no ash | 100 kg/h |
| 20% of contained water | 70 kg/h |
| 40% of contained water | 50 kg/h |
| 60% of contained water | 30 kg/h |

As can be seen from Table 1, an increase in the conteded water causes a rapid deterioration of the gasification capability. When the temperature of the wall face of the primary gasification reaction room 202 decreases or when the hydrocarbon in the generated gas increases, the supply amount of the biomass raw material is reduced for adjustment.

The embodiment 2 shows the biomass gasification capability of the gasification reaction apparatus 201 to be maintained at high level. According to the experiment, about 2 to 15% of carbon dioxide to the weight of the biomass supply or about 2 to 10% of nitrogen to the weight of the biomass supply was effective. When air is used, about 2 to 5% of air is desired because air causes a part of the generated gas to combust to reduce the calorific value.

Third Embodiment

Figure 6:
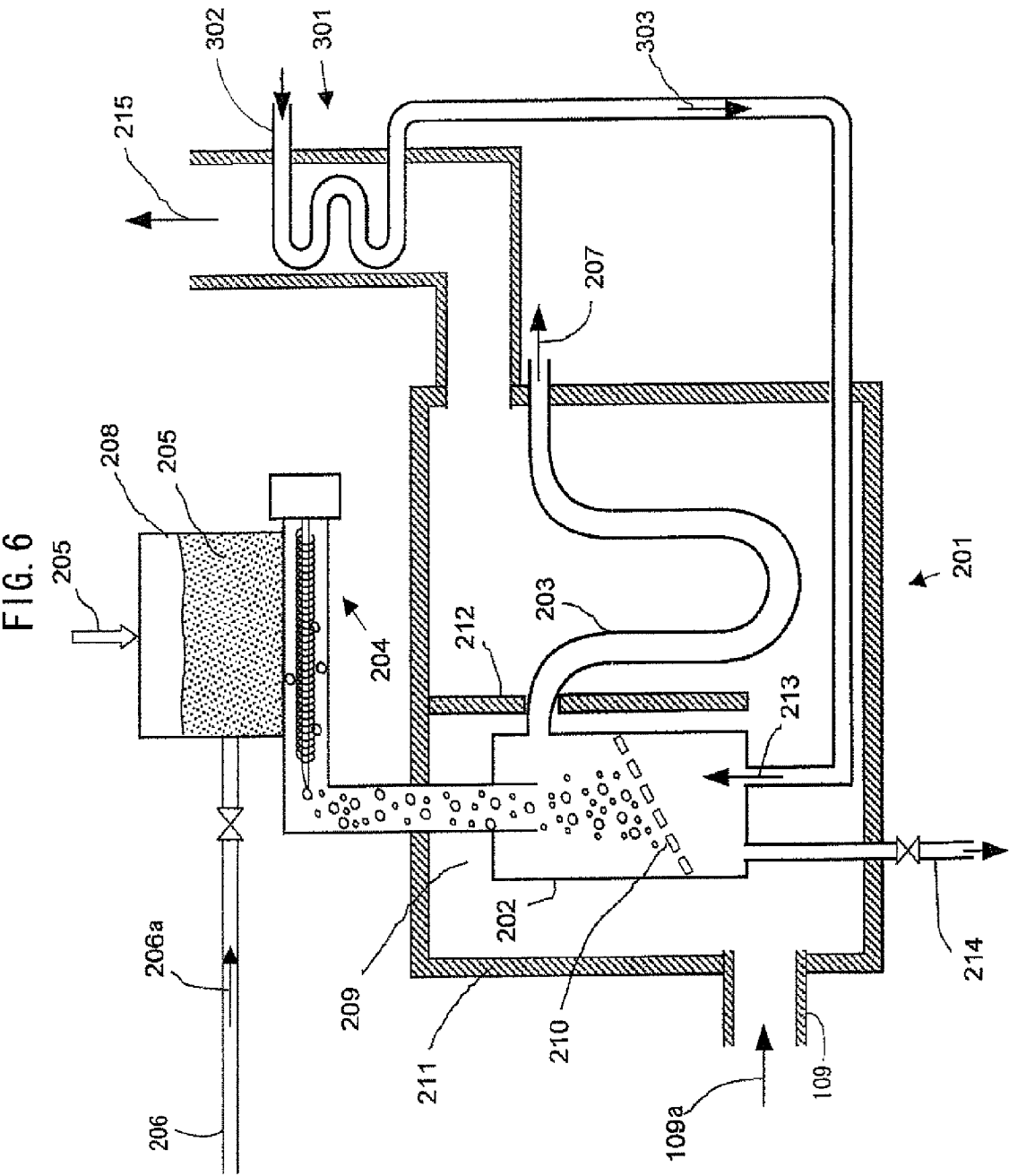
FIG. 6 shows a schematic view illustrating a biomass gasification reaction apparatus according to the third embodiment further including a heat-resistant partition wall in the gasification reaction apparatus.

FIG. 6 shows a schematic view illustrating a gasification reaction apparatus according to the third embodiment of the present invention in which a heat-resistant partition wall is further included therein.

In this embodiment, the primary gasification reaction room 202 and the secondary gasification reaction pipe 203 are divided by a heat-resistant partition wall 212 for the purpose of blocking radiation heat. The first gasification reaction room 202 forms a reaction furnace high temperature room 209 independent from the secondary gasification reaction pipe 203. The combustion gas generated in the high-temperature combustion gas generation apparatus 101 is sent to the gasification reaction apparatus 201 to firstly heat the primary gasification reaction room 202 to secondly heat the secondary gasification reaction pipe 203. Since the primary gasification reaction room 202 forms the reaction furnace high temperature room 209 independent from the secondary gasification reaction pipe 203, the primary gasification reaction room 202 can be set to have higher temperature. Since the temperature of the secondary gasification reaction pipe 203 may be slightly lower than that of the primary gasification reaction room 202, this embodiment is particularly effective when the temperature of the primary gasification reaction room 202 is desired to be maintained at higher temperature in order to increase the hydrogen component in the generated gas.

Fourth Embodiment

Figure 7:
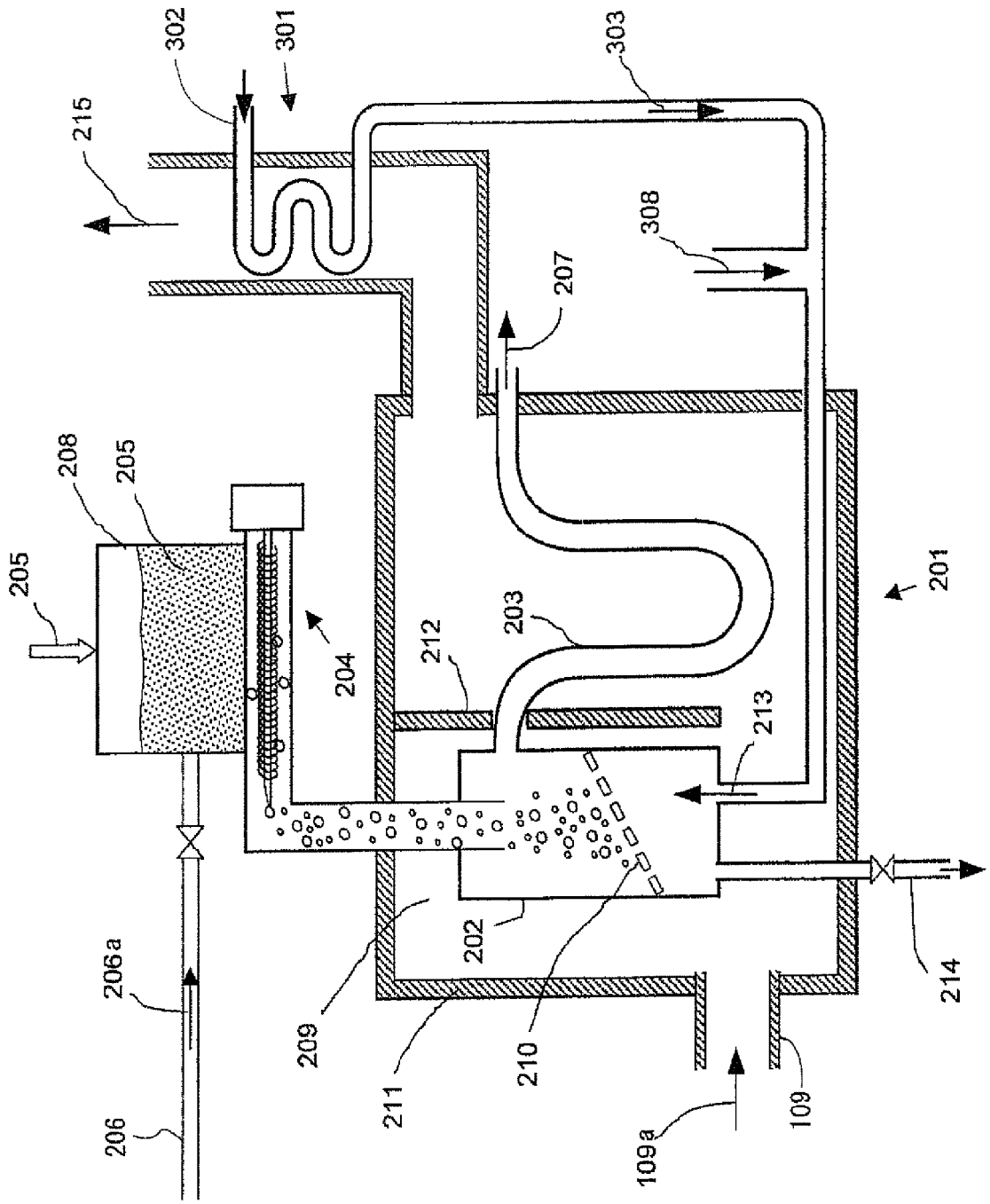
FIG. 7 shows a schematic view illustrating a biomass gasification reaction apparatus according to the fourth embodiment further including gasification agent substitute gas (carbon dioxide).

FIG. 7 shows a schematic view illustrating a gasification reaction apparatus according to the fourth embodiment of the present invention in which gasification agent substitute gas (i.e., carbon dioxide) 308 is further included. In this illustrative embodiment, the overheated water vapor 303 obtained by heating water is further mixed with gasification agent substitute gas 308 including carbon dioxide and the resultant water vapor is supplied from the gasification agent supply line 302 to the bottom of the primary gasification reaction room 202. Carbon dioxide has high temperature and has some function as gasification agent. Carbon dioxide however causes an increase in the carbon dioxide component in the generated gas. When the generated gas is used for methanol synthesis gas, carbon dioxide in the generated gas is bound to hydrogen to generate methanol. This provides, when hydrogen can be supplied from a supply source other than the biomass gasification apparatus in particular, an effect of increasing the production amount of methanol synthesis by the supply of carbon dioxide.

Figure 8:
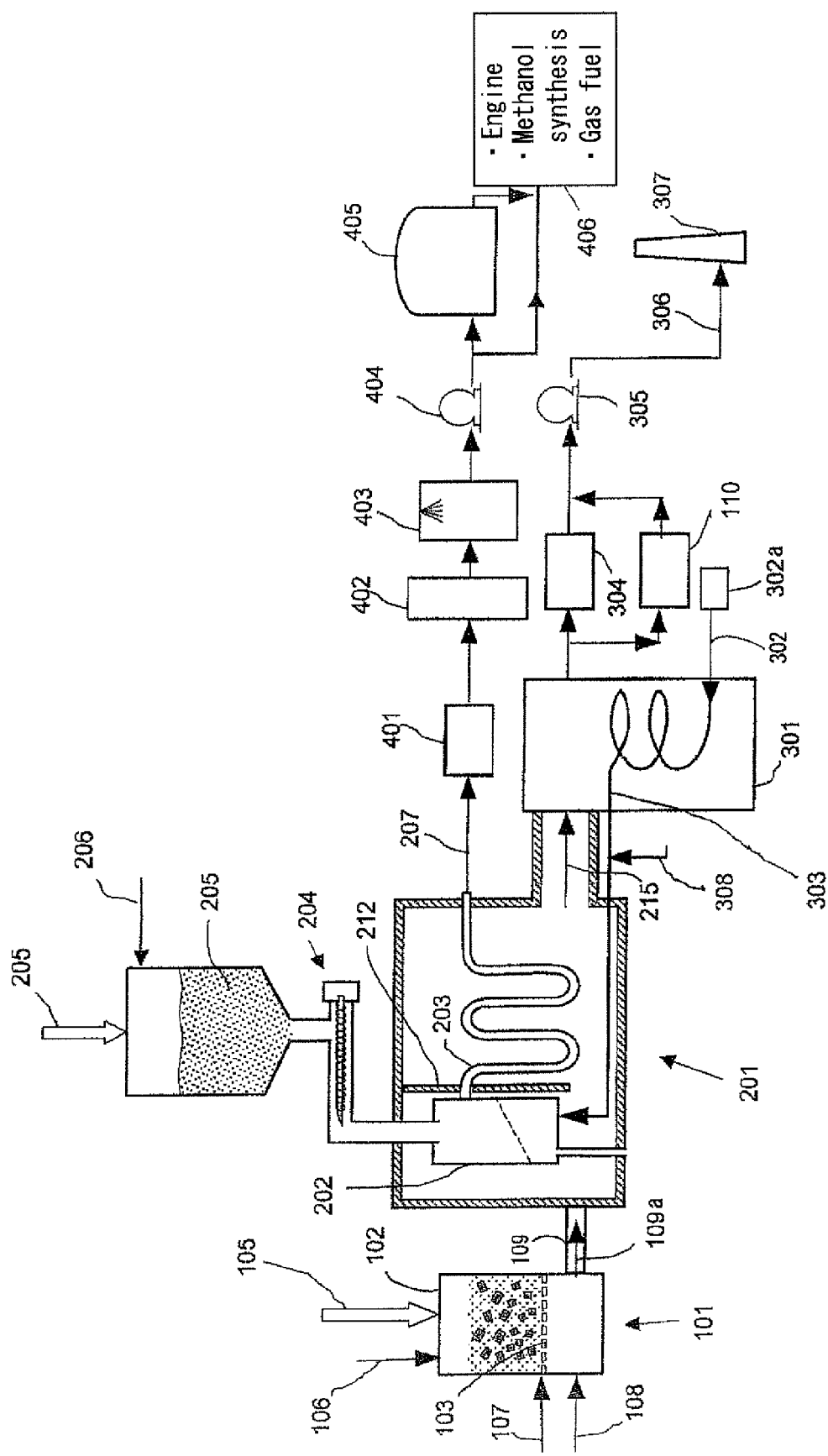
FIG. 8 shows a schematic view illustrating the entire configuration of a biomass gas thermochemical gasification apparatus according to the fourth embodiment.

FIG. 8 illustrates the entire configuration of biomass gas thermochemical gasification apparatus according to the fourth embodiment. The details of the configuration are as described above.

INDUSTRIAL APPLICABILITY

The present invention provides a biomass gasification apparatus that is a small plant but that is superior to large biomass chip power generation using a steam turbine, that is highly-efficient and that is suitable for the local-production-for-local-consumption-type one or the small-scale-distributed-type one.

Fuel gas obtained by the biomass gasification reaction apparatus of the present invention contains $H_2$, CO, and $CH_4$ as main components and has high quality and high calorie. Thus, the fuel gas obtained by the biomass gasification reaction apparatus can be used for many applications as high-calorie fuel for engine power generation, turbine power generation, and fossil fuel substitute and chemical synthesis raw material as well as synthesis gas for methanol synthesis and GTL synthesis.

What is claimed is:

1. A biomass gasification apparatus comprising, a high temperature combustion gas generation apparatus for combusting biomass to generate combustion gas, a biomass supply hopper, and a gasification reaction apparatus,
   wherein the gasification reaction apparatus includes therein a primary gasification reaction room connected to a secondary gasification reaction pipe and to a gasification agent supply line, a heat-resistant partition wall installed between an outer space of the primary gasification reaction room and the secondary gasification reaction pipe, and the primary gasification reaction room is connected to the biomass supply hopper via a biomass supply line,
   the high temperature combustion gas generation apparatus includes a downward flow-type vertical combustion furnace having a fixed floor, the downward flow-type vertical combustion furnace is equipped with a fire grate in its lower part, and primary air is supplied to an upper part of the fire grate, secondary air is supplied to inside of the metal fire grate, and tertiary air is supplied to the lower part of the fire grate, and
   the gasification reaction apparatus and the high temperature combustion gas generation apparatus are connected via a combustion gas supply line.

2. The biomass gasification apparatus as set forth in claim 1, wherein the biomass supply hopper is combined with a coarse powder-accompanying gas supply line.

3. The biomass gasification apparatus as set forth in claim 2, wherein nitrogen gas, carbon dioxide, air, or their mixture is supplied from the biomass supply line.

4. The biomass gasification apparatus as set forth in claim 1 or 2, wherein the high temperature combustion gas generation apparatus controls a biomass fuel combustion rate depending on the supply amount of the primary air and the secondary air per hour, and uses the tertiary air to achieve complete combustion of unburned gas and to control high temperature combustion gas discharge temperature.

5. The biomass gasification apparatus as set forth in claim 1 or 2, wherein the primary air, the secondary air, and the tertiary air supplied to the high-temperature combustion gas generation apparatus are preheated by an air preheater in order to control the combustion rate depending on a difference in a biomass quality, particularly contained water and the discharge temperature of the high-temperature combustion gas.

6. The biomass gasification apparatus as set forth in claim 1 or 2, wherein a lower part of the primary gasification reaction room has a ceramic porous plate or a punching-type porous plate and gasification agent is supplied from a lower part of the porous plate in an upward flow.

7. The biomass gasification apparatus as set forth in claim 1 or 2, wherein a body of the primary gasification reaction room is made of ceramic material such as aluminum titanate or is coated with the same metal material or is made of high-temperature resistant material such as high-chrome or high-nickel alloy.

8. The biomass gasification apparatus as set forth in claim 1 or 2, wherein a wall area of the primary gasification reaction room to a supply of dry biomass raw material of 1 kg/h is at least 0.008 $m^2$ or more when a wall temperature is 800 degrees C. and is at least 0.004 $m^2$ or more when the wall temperature is 1000 degrees C.

9. The biomass gasification apparatus as set forth in claim 1 or 2, wherein the biomass gasification apparatus has a control function to control, depending on the contained water of the biomass, an amount of the biomass supply from the biomass hopper to provide an appropriate generated gas quality.

10. The biomass gasification apparatus as set forth in claim 1 or 2, wherein the combustion gas used for the heating in the gasification reaction apparatus is discharged, after the use, to an outside of the gasification reaction apparatus and is collected in a heat recollector by a waste heat boiler to generate overheated water vapor that is used as the gasification agent.

11. The biomass gasification apparatus as set forth in claim 9, wherein mixed gas of carbon dioxide and water vapor is supplied as the gasification agent instead of water vapor.

* * * * *